United States Patent
Kim et al.

(10) Patent No.: US 10,392,050 B2
(45) Date of Patent: Aug. 27, 2019

(54) STEERING APPARATUS FOR STEER BY WIRE SYSTEM

(71) Applicants: Hyundai Motor Company, Seoul (KR); Kia Motors Corporation, Seoul (KR)

(72) Inventors: Min Jun Kim, Busan (KR); Young Dae Park, Asan-si (KR); Byung Rim Lee, Seongnam-si (KR); Sang Woo Hwang, Seoul (KR); Se Hyun Chang, Suwon-si (KR); Hyeon Seok Cho, Pyeongtaek-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 122 days.

(21) Appl. No.: 15/632,531

(22) Filed: Jun. 26, 2017

(65) Prior Publication Data
US 2018/0141585 A1    May 24, 2018

(30) Foreign Application Priority Data
Nov. 23, 2016    (KR) .................. 10-2016-0156506

(51) Int. Cl.
*B62D 6/08* (2006.01)
*B62D 5/04* (2006.01)
*B62D 5/06* (2006.01)
*B62D 5/00* (2006.01)

(52) U.S. Cl.
CPC ............... *B62D 6/08* (2013.01); *B62D 5/001* (2013.01); *B62D 5/006* (2013.01); *B62D 5/043* (2013.01); *B62D 5/0463* (2013.01); *B62D 5/0466* (2013.01); *B62D 5/06* (2013.01); *B62D 5/049* (2013.01)

(58) Field of Classification Search
CPC .......... B62D 6/08; B62D 5/001; B62D 5/006; B62D 5/043; B62D 5/0463; B62D 5/0466; B62D 5/06
USPC ........................................ 180/443, 444, 446
See application file for complete search history.

(56) References Cited

U.S. PATENT DOCUMENTS

| | | | | |
|---|---|---|---|---|
| 3,831,701 A * | 8/1974 | Pilon | ...................... | B62D 5/008 180/407 |
| 6,896,090 B2 * | 5/2005 | Kanda | .................... | B62D 5/008 180/402 |

(Continued)

FOREIGN PATENT DOCUMENTS

| | | |
|---|---|---|
| JP | 4626345 B2 | 2/2011 |
| KR | 20040017349 A | 2/2004 |

(Continued)

*Primary Examiner* — Jacob D Knutson
(74) *Attorney, Agent, or Firm* — Slater Matsil, LLP (57) ABSTRACT

A steering apparatus for a steer by wire system includes a first motor and a second motor configured to provide a torque. A first planetary gear set is configured to receive the torque from the first motor and to generate a reaction torque required for steering. A second planetary gear set is configured to receive the torque from the steering wheel and the second motor, and to variably output a gear ratio for an input by the steering wheel depending on a rotation of the second motor. A stopping mechanism is configured to limit a maximum rotation angle of the steering wheel.

20 Claims, 5 Drawing Sheets

(56) References Cited

U.S. PATENT DOCUMENTS

| | | | | |
|---|---|---|---|---|
| 7,207,411 | B2* | 4/2007 | Duits | B62D 5/005 |
| | | | | 180/402 |
| 7,665,572 | B2* | 2/2010 | Yamanaka | B62D 5/008 |
| | | | | 180/402 |
| 8,006,799 | B2* | 8/2011 | Yamanaka | B62D 5/001 |
| | | | | 180/444 |
| 9,327,764 | B2* | 5/2016 | Limpibunterng | B62D 1/286 |
| 2006/0205551 | A1* | 9/2006 | Yamanaka | B62D 5/008 |
| | | | | 475/5 |
| 2010/0288576 | A1* | 11/2010 | Yamanaka | B62D 5/001 |
| | | | | 180/443 |

FOREIGN PATENT DOCUMENTS

| | | |
|---|---|---|
| KR | 20080109963 A | 12/2008 |
| KR | 20100094731 A | 8/2010 |

* cited by examiner

<PARKING MODE STEERING ANGLE ±360°>
STEERING ANGLE NEUTRAL POSITION

FIG. 5B

<EMERGENCY MODE>
STEERING ANGLE NEUTRAL POSITION

STEERING APPARATUS FOR STEER BY WIRE SYSTEM

CROSS-REFERENCE TO RELATED APPLICATIONS

The present application claims priority to Korean Patent Application No. 10-2016-0156506, filed on Nov. 23, 2016, the entire contents of which is incorporated herein for all purposes by this reference.

TECHNICAL FIELD

The present invention relates to a motor-driven power steering apparatus.

BACKGROUND

A steer by wire system is a steering system separating a mechanical connection between a steering wheel and a driving wheel of a vehicle and may steer the vehicle by receiving a rotation signal of the steering wheel through an electronic control unit (ECU) and operating a steering motor connected to the driving wheel on the basis of the received rotation signal.

The steer by wire system removes the mechanical connection structure of the existing steering system, and thus has advantages of increasing layout freedom due to the configuration of the steering system, improving fuel efficiency, and removing disturbance reversely input from a wheel.

However, the steer by wire system has a disadvantage in that a driver may not properly fed back with steering information that the driver requires, due to the disconnection of the mechanical connection structure.

For example, the existing steering system need not separately generate a steering wheel reaction torque due to the mechanical connection structure by a universal joint, or the like, but the steer by wire system does not have the mechanical connection structure and therefore needs to generate the steering wheel reaction torque or a recovering wheel reaction torque using a motor, or the like.

Further, even if a tire reaches a rotation limit and thus no longer returns, the steering wheel may be continuously rotated, and therefore a rotation range of the steering wheel needs to be limited.

Therefore, in the steer by wire system field, a technology of constantly limiting a rotation angle of the steering wheel is required and a mechanism of mechanically limiting the rotation range of the steering wheel has been variously proposed in recent years.

However, the mechanism of mechanically limiting a rotation and the mechanism of generating a steering wheel reaction torque are separately installed to reduce unique space efficiency of the steer by wire system.

The contents described as the related art have been provided only for assisting in the understanding for the background of the present invention and should not be considered as corresponding to the related art known to those skilled in the art.

SUMMARY

The present invention relates to a motor-driven power steering apparatus and, in particular embodiments, to a motor-driven power steering apparatus capable of improving steering feel and driving stability of a vehicle while reducing product costs by integrating an MDPS system with an AFS system.

Embodiments of the present invention provide a steering apparatus for a steer by wire system capable of implementing a mechanism of limiting a rotation angel of a steering wheel while generating a steering wheel reaction torque and a recovering wheel reaction torque by using a planetary gear decelerator structure.

According to an exemplary embodiment of the present invention, a steering apparatus for a steer by wire system includes a first motor and a second motor configured to provide a torque. A first planetary gear set is configured to receive the torque from the first motor and to reduce the torque and output the reduced torque to a steering wheel to generate a reaction torque required for steering. A second planetary gear set is configured to receive the torque from the steering wheel and the second motor, to reduce and output the torque, and to variably output a gear ratio for an input by the steering wheel depending on a rotation of the second motor. A stopping mechanism is configured to be locked to a second stopper portion on a rotation path of a first stopper portion rotated on the basis of the torque output from the second planetary gear set to serve to limit a maximum rotation angle of the steering wheel.

The first motor, the first planetary gear set, the second planetary gear set, and the stopping mechanism may be sequentially inserted into a steering shaft connected to the steering wheel.

The first planetary gear set may be provided with at least three rotation elements, and one of the at least three rotation elements may receive the torque from the first motor, the other thereof may reduce the torque and outputs the reduced torque to the steering wheel, and the rest rotation elements may be fixed.

The first planetary gear set may be configured to include first, second, and third rotation elements, the first rotation element may be a first sun gear directly connected to the first motor, the second rotation element may be a first planetary gear that is connected to the steering wheel to reduce and output a torque transferred from a first sun gear, and the third rotation element may be a first ring gear operated as a regular fixed element.

The second planetary gear set may be provided with at least three rotation elements, and one of the at least three rotation elements may receive the torque from the steering wheel, the other thereof may reduce the torque and output the reduced torque to the stopping mechanism, and the rest rotation elements may be connected to the second motor to receive the torque or selectively fixed.

The second planetary gear set may be configured to include first, second, and third rotation elements, the first rotation element may be a second sun gear connected to the steering wheel, the second rotation element may be a second planetary gear that is connected to a first stopper portion to reduce and output a torque transferred from the second sun gear, and the third rotation element may be a second ring gear receiving the torque from the second motor or operated as a selective fixed element.

The stopping mechanism may include: a first stopper portion configured to be directly connected to the second planetary gear and having a protrusion formed at a predetermined radius position thereof; and a second stopper portion configured to be provided with a slot having the protrusion inserted thereinto and having a predetermined rotation angle range along a rotation path of the protrusion.

The rotation angle range of the slot may be determined by a maximum steering angle required in the steering wheel with respect to a steering angle neutral and a relationship between gear ratios of the first planetary gear set and the second planetary gear set.

The steering apparatus may further include: a steering angle sensor configured to measure the steering angle of the steering wheel; and a controller configured to perform a control to calculate a pinion rotation angle of a pinion included in a steering gear box and increase a gear ratio of the second planetary gear set by operating the second motor when a difference between the steering angle and the pinion rotation angle exceeds a set value.

DETAILED DESCRIPTION OF ILLUSTRATIVE EMBODIMENTS

Exemplary embodiments of the present invention will be described in detail with reference to the accompanying drawings.

A steering apparatus for a steer by wire system according to an exemplary embodiment of the present invention may be configured to include a first motor 1 and a second motor 7, a first planetary gear set PG1 and a second planetary gear PG2, and a stopping mechanism.

Figure 1:
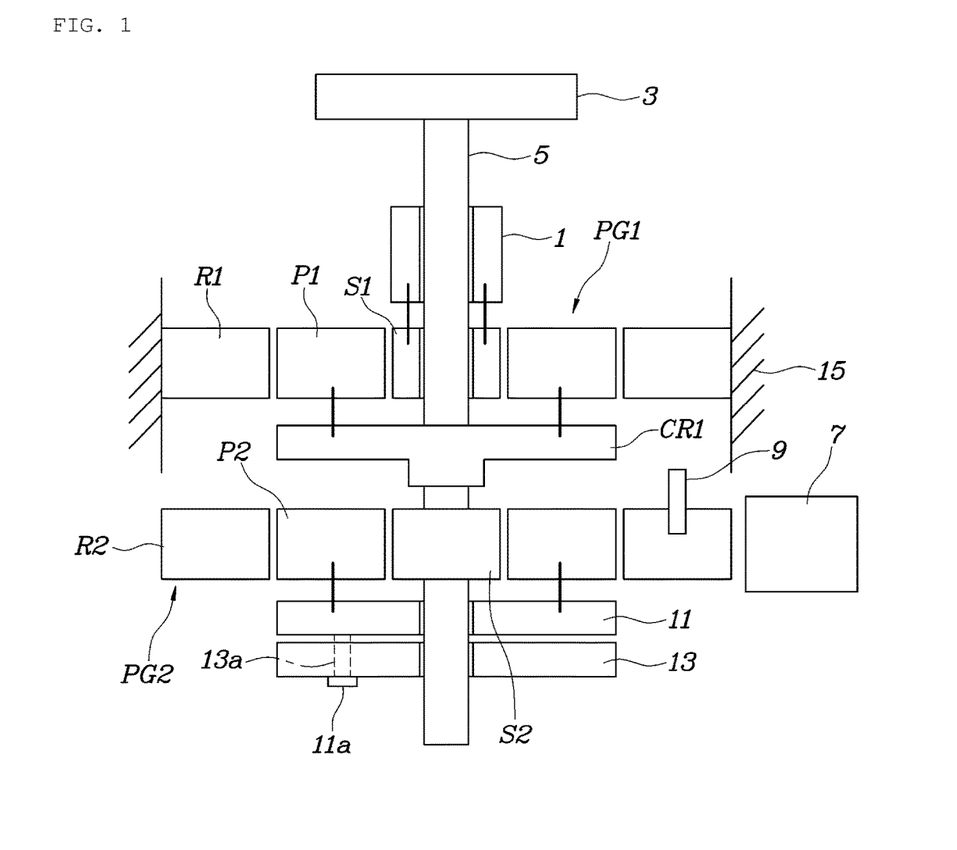
FIG. 1 is a view schematically illustrating the whole structure of a steering apparatus according to an exemplary embodiment of the present invention.

Describing in detail it with reference to FIG. 1, first, the first motor 1 and the second motor 7 are connected to the first planetary gear set PG1 and the second planetary gear set PG2, and thus each may provide a torque.

The first planetary gear set PG1 may receive the torque from the first motor 1 and may reduce the torque and output the reduced torque to the steering wheel 3 to generate a reaction torque required for steering.

The second planetary gear set PG2 may receive the torque from the steering wheel 3 and the second motor 7, reduce and output the torque, and variably output a gear ratio for an input by the steering wheel 3 depending on the rotation of the second motor 7.

The stopping mechanism is provided to be locked to a second stopper portion 13 on a rotation path of the first stopper portion 11 rotated on the basis of the torque output from the second planetary gear set PG2 to serve to limit the maximum rotation angle of the steering wheel 3.

That is, according to the above configuration, the torque provided from the first motor 1 is provided to the steering wheel 3 while being reduced by the first planetary gear set PG1, thereby generating the steering wheel reaction torque and the recovering wheel reaction torque to the steering wheel 3.

Further, a steering force of the steering wheel 3 is transferred to the stopping mechanism through the second planetary gear set PG2, and when a steering angle of the steering wheel 3 is increased, the rotation of the steering wheel 3 is limited by the stopping mechanism to mechanically limit the maximum rotation angle of the steering wheel 3, such that a driver recognizes a physical steering angle tip.

In addition, the gear ratio of the second planetary gear set PG2 by the torque provided from the second motor 7 may be increased and therefore even when the steering angle of the steering wheel 3 is little changed, the stopping operation by the stopping mechanism is quickly made, such that a driver may more quickly recognize the physical steering angle tip upon parking or upon an emergency situation in which a tire is caught in a curb, or the like and thus is not turned.

Therefore, by implementing a function of limiting the maximum steering angle of the steering wheel 3 while generating the steering wheel reaction torque and the recovering wheel reaction torque to the steering wheel 3 by using the planetary gear decelerator and implementing an active front steering system (AFS) function of actively controlling a steering gear ration depending on a vehicle driving situation, unique space efficiency of the steer by wire system is secured and costs and weight are saved, thereby improving marketability of a vehicle.

In the steering apparatus having the above configuration, the first motor 1, the first planetary gear set PG1, the second planetary gear set PG2, and the stopping mechanism may be sequentially inserted into a steering shaft 5 connected to the steering wheel 3.

That is, the first motor 1 may have a hollow shape with an empty center and may be installed under the steering wheel 3. Further, a shaft of the first planetary gear set PG1 may be installed under the first motor while forming a concentric axis, a shaft of the second planetary gear set PG2 may be installed under the first planetary gear set PG1 while forming a concentric axis, and the stopping mechanism may be installed under the second planetary gear set PG2.

At this point, the second motor 7 may be installed in a structure in which it is meshed with a side surface of the second planetary gear set PG2, preferably, a second ring gear R2 of the second planetary gear set PG2.

Further, the first planetary gear set PG1 is provided with at least three rotation elements, in which one of the at least three rotation elements may receive the torque from the first motor 1, the other thereof may reduce the torque and output the reduced torque to the steering wheel 3, and the rest rotation elements may be fixed.

At this point, the first planetary gear set PG1 and the first motor 1 may be provided in the state in which the first planetary gear set PG1 is accommodated in a housing 15 and the rotation element operated as the fixed element of the first planetary gear set PG1 may be fixed to an inner surface of the housing.

Further, the steering shaft 5 may be installed by penetrating through an upper end of the housing.

Figure 2:
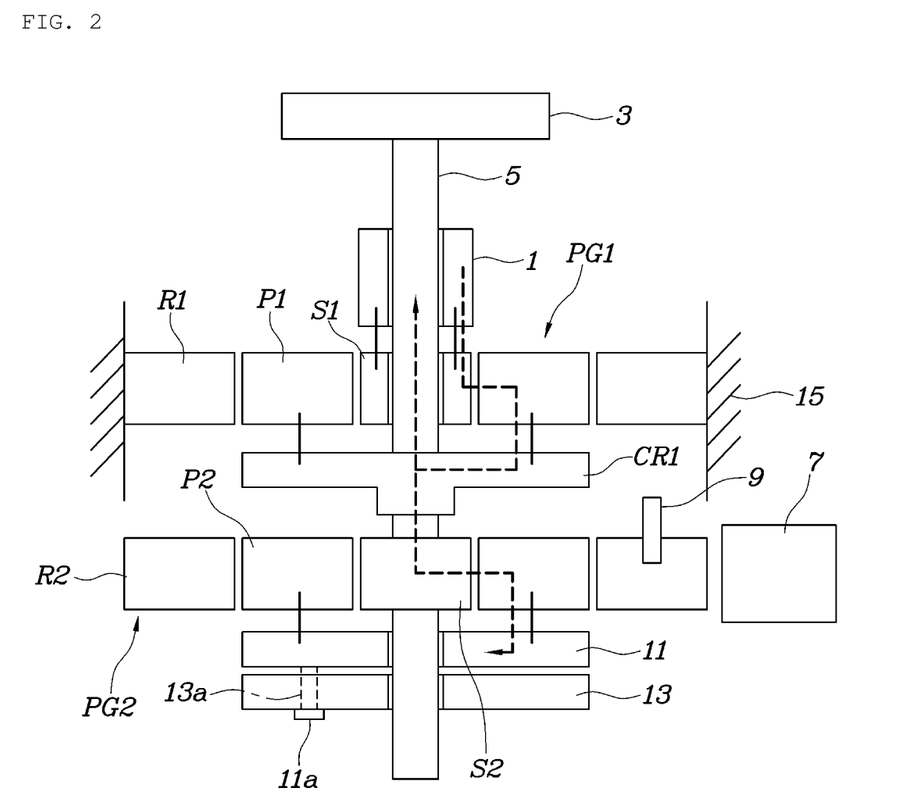
FIG. 2 is a diagram illustrating a power transfer path for a generation of a steering wheel reaction torque and a limitation of a rotation angle of a steering wheel in a normal driving mode according to an exemplary embodiment of the present invention.
Figure 4:
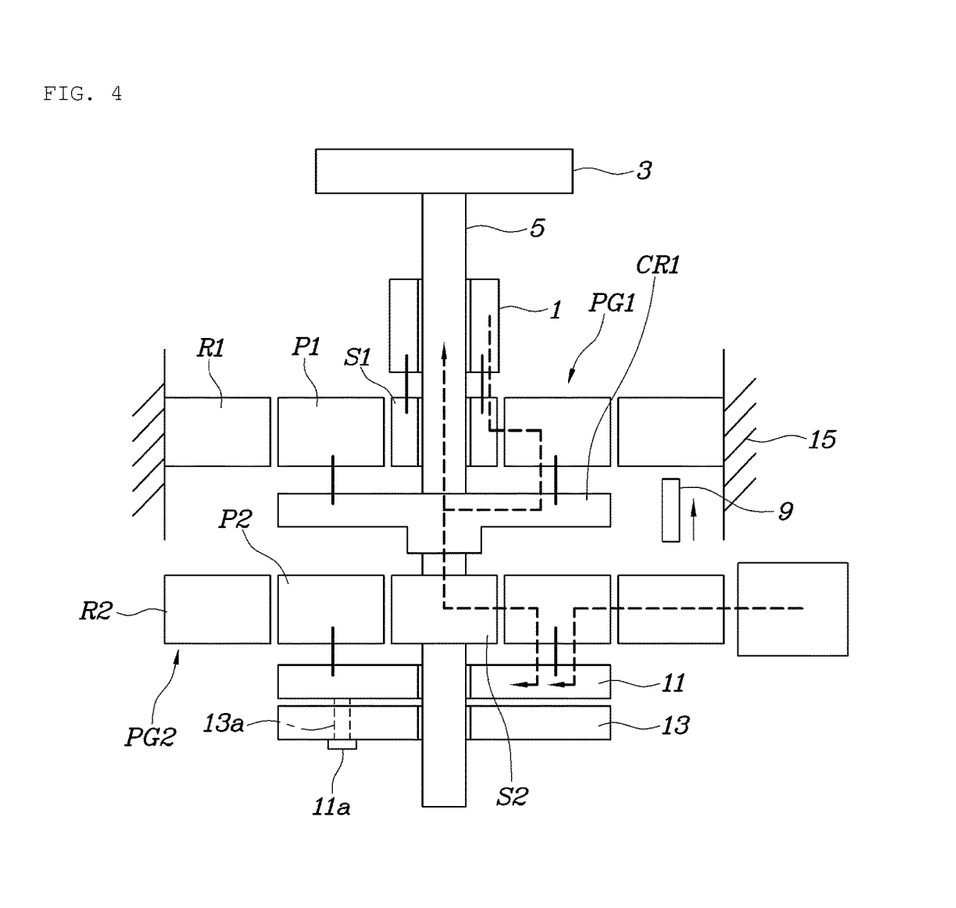
FIG. 4 is a diagram illustrating a power transfer path for a generation of a steering wheel reaction torque and a limitation of a rotation angle of a steering wheel in a parking mode and an emergency mode according to an exemplary embodiment of the present invention.

Describing in more detail the configuration of the first planetary gear set PG1 with reference to FIGS. 2 and 4, the first planetary gear set PG1 may be configured to include first, second, and third rotation elements, for example, configured to have a gear ratio of 3:1.

Among those, the first rotation element may be a first sun gear S1 directly connected to the first motor 1.

Further, the second rotation element may be a first planetary gear P1 that is connected to the steering wheel 3 to reduce and output the torque transferred from the first sun gear S1. At this point, the first planetary gear P1 may be directly connected to a first carrier CR1 and the first carrier CR1 may be connected to the steering shaft 5 to be rotated together with the steering shaft 5.

Further, the third rotation element may be a first ring gear R1 operated as a regular fixed element. That is, the first ring gear R1 may be fixed to the inner surface of the housing to be operated as the regular fixed element.

According to the configuration of the first planetary gear set PG1 as described above, the torque of the first motor 1 may be reduced in response to a reduction gear ratio implemented in the first planetary gear set PG1 and may be output to the steering shaft 5, thereby generating the steering wheel reaction torque and the recovering wheel reaction torque and providing the generated steering wheel reaction torque and recovering wheel reaction torque to the steering wheel 3.

Further, the second planetary gear set PG2 is provided with at least three rotation elements, in which one of the at least three rotation elements may receive the torque from the steering wheel 3, the other thereof may reduce the torque and output the reduced torque to the stopping mechanism, and the rest rotation elements may be connected to the second motor 7 to receive the torque or selectively fixed.

Describing in more detail the configuration of the second planetary gear set PG2, the second planetary gear set PG2 may be configured to include first, second, and third rotation elements, for example, may be configured to have a gear ratio of 2:1 under the condition in which the torque of the second motor 7 is not input.

Among those, the first rotation element may be a second sun gear S2 connected to the steering wheel 3 and the second sun gear S2 may be installed to be directly connected to the steering shaft 5.

Further, the second rotation element may be a second planetary gear P2 that is connected to the first stopper portion 11 to reduce and output the torque transferred from the second sun gear S2. That is, the second planetary gear P2 may be rotated together with the first stopper portion 11 while being installed to be directly connected to the first stopper portion 11.

Further, the third rotation element may be a second ring gear R2 that receives the torque from the second motor 7 or is operated as a selective fixed element.

For example, the rotation shaft of the second motor 7 is provided with a worm gear and the worm gear is meshed with the second ring gear R2 having a worm wheel shape to be able to provide the torque of the second motor 7 to the second ring gear R2. Further, the rotation of the second ring gear R2 may be limited by a solenoid valve 9 and thus the second ring gear R2 may be operated as the fixed element.

Meanwhile, the stopping mechanism according to the exemplary embodiment of the present invention may be configured to include the first stopper portion 11 and the second stopper portion 13 again.

Figure 3A:
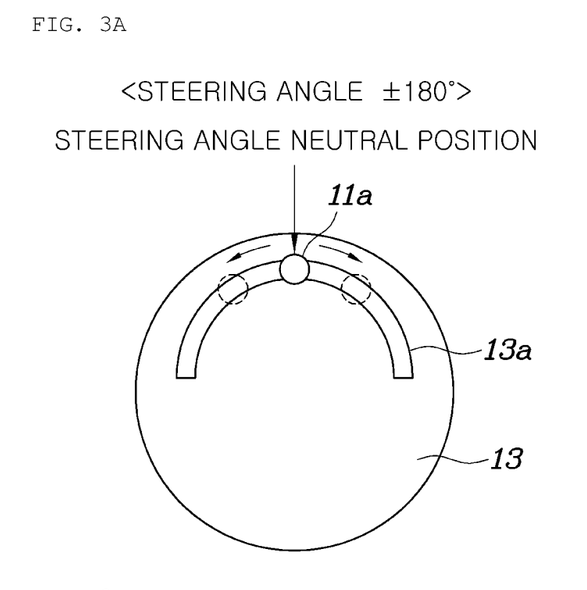
FIGS. 3A and 3B are diagrams for describing an operation state of a stopping mechanism depending on a change in a steering angle of a steering wheel in the normal driving mode of FIG. 2.
Figure 3B:
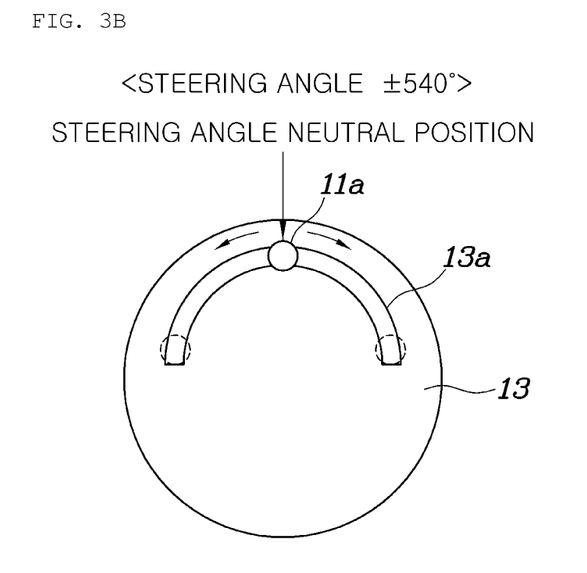

Describing in detail it with reference to FIGS. 2 and 3A and 3B, the first stopper portion 11 is directly connected to the second planetary gear P2 and a predetermined radius position thereof may be provided with a protrusion 11a.

Further, the second stopper portion 13 may be provided with a slot 13a having the protrusion 11a inserted thereinto and having a predetermined rotation angle range along the rotation path of the protrusion 11a.

That is, the first stopper portion 11 and the second stopper portion 13 are provided at a lower end of the steering shaft 5 while facing each other and move while being guided within the slot 13a in the state in which the protrusion 11a formed on the first stopper portion 11 is inserted into the slot 13a formed on the second stopper portion 13.

At this time, both of the first stopper portion 11 and the second stopper portion 13 are provided in the state in which the steering shaft 5 is permitted to be relatively rotated but the first stopper portion 11 is rotated together with the second planetary gear P2 and the second stopper 13 has a rotation limiting structure.

In addition, the rotation angle range of the slot 13a formed on the second stopper portion 13 may be determined by the maximum steering angle required in the steering wheel 3 with respect to a steering angle neutral and the relationship between the gear ratios of the first planetary gear set PG1 and the second planetary gear set PG2.

For example, when the maximum steering angle required at the time of the full turn in one direction is 540° and the other direction from the steering angle neutral and the gear ratio by the combination of the first planetary gear set PG1 and the second planetary gear set PG2 is 6:1, the rotation angle range of the slot 13a may be determined as 180°.

Therefore, in the case in which the protrusion 11a is configured to be positioned at a center of the slot 13a at the steering angle neutral, when the operation of the full turn of the steering wheel 3 by 540° in one direction or the other direction, the protrusion 11a is rotated by 90o to be locked to an end portion of the slot 13a, such that the driver recognizes the physical steering angle tip.

Meanwhile, according to the exemplary embodiment of the present invention, when the rotation of the tire is hindered by external factors, for example, when the tire is caught in a curb or a pavement and thus is not steered, the driver needs to recognize that the tire is not rotated despite the rotation of the steering wheel 3.

When the driver does not recognize it, the tire continuously receives the steering input in the state in which it is not rotated, which may lead to the problem of the overload of the motor, or the like.

To this end, according to the exemplary embodiment of the present invention, the steering apparatus may include a steering angle sensor configured to measure the steering angle of the steering wheel 3 and a controller configured to perform a control to calculate a pinion rotation angle of a pinion included in a steering gear box and increase the gear ratio of the second planetary gear set PG2 by operating the second motor 7 when a difference between the steering angle and the pinion rotation angle exceeds a set value.

At this time, the pinion may be connected to the steering motor that is installed in the steering gear box to provide a rack axial force and the pinion rotation angle may be calculated on the basis of the rotation angle of the steering motor.

That is, when the difference between the steering angle and the pinion rotation angle exceeds the set value, a locking action of the second ring gear R2 by the solenoid valve 9 is released and the second ring gear R2 is rotated by the operation of the second motor 7 to increase the gear ratio of the second planetary gear set PG2. Therefore, even when the steering wheel 3 is not rotated up to the full turn but is rotated a little, the protrusion 11a is quickly rotated to be locked to an end part of the slot 13a, such that the driver may quickly recognize that the tire may not be rotated.

Hereinafter, an action and an effect of the present invention will be described.

First, describing the general driving mode in which the current vehicle speed is driven over a reference vehicle speed equal to or greater than a predetermined vehicle speed with reference to FIGS. 2 and 3A, the torque provided from the first motor 1 is transferred to the first carrier CR1 by being reduced by the first sun gear S1 and the first planetary gear P1. At this point, the first carrier CR1 is directly connected to the steering shaft 5 to generate the steering wheel reaction torque and the recovering wheel reaction torque using the torque of the first motor 1 and provide the generated steering wheel reaction torque and recovering wheel reaction torque to the steering wheel 3. The reaction torque generation action is always performed.

Further, in this case, since the second ring gear R2 is fixed by the solenoid valve 9, the torque provided from the steering wheel 3 is reduced by the second sun gear S2 and the second planetary gear P2 to be transferred to the first stopper portion 11, such that the protrusion 11a formed on the first stopper portion 11 is rotated along the slot 13a formed on the second stopper portion 13.

For example, when the steering angle of the steering wheel 3 is steered by +180°, the protrusion 11a formed on the first stopper portion 11 may be rotated by ±30°.

In addition, referring to FIG. 3B, in the U turn situation, or the like, generally, the steering wheel 3 is full turned in one direction.

For example, when the steering angle of the steering wheel 3 is steered by ±540°, the protrusion 11a formed on the first stopper portion 11 is rotated by 90o, and thus the protrusion 11a is locked to the end of the slot 13a, such that the steering rotation of the steering wheel 3 may be physically limited.

Figure 5A:
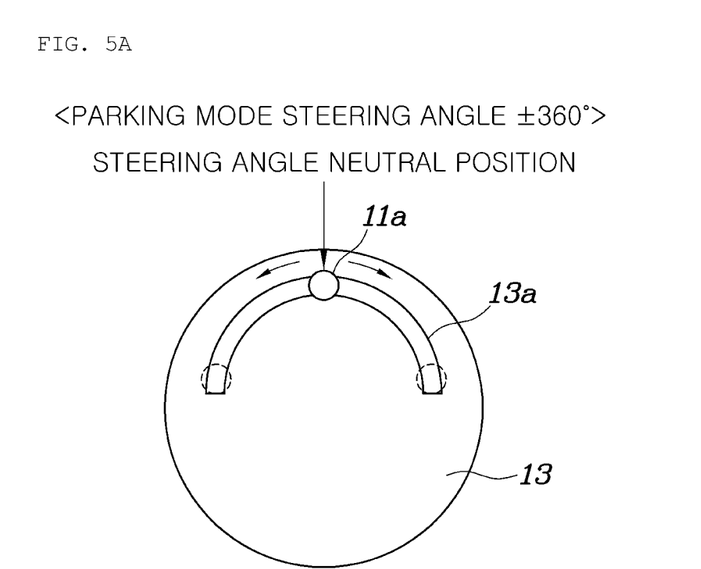
FIGS. 5A and 5B are diagrams for describing an operation state of the stopping mechanism in the parking mode and the emergency mode of FIG. 4.

Meanwhile, describing the case of the parking mode with reference to FIGS. 4 and 5A, the locking action of the solenoid valve 9 is released and the second motor 7 is operated.

Then, the second ring gear R2 is rotated by the operation of the second motor 7, such that the gear ratio of the second gear planetary set PG2 reduced by the second sun gear S2 and the second planetary gear P2 is increased.

Therefore, the rotation of the protrusion 11a formed on the first stopper portion 11 is more quickly performed than the general driving mode, such that the steering operation of the steering wheel is more conveniently performed upon parking.

For example, when the steering angle of the steering wheel 3 is steered by ±360°, the protrusion 11a formed on the first stopper portion 11 is rotated by ±90°, and thus the protrusion 11a is locked to the end of the slot 13a, such that the steering rotation of the steering wheel 3 may be physically limited.

Figure 5B:
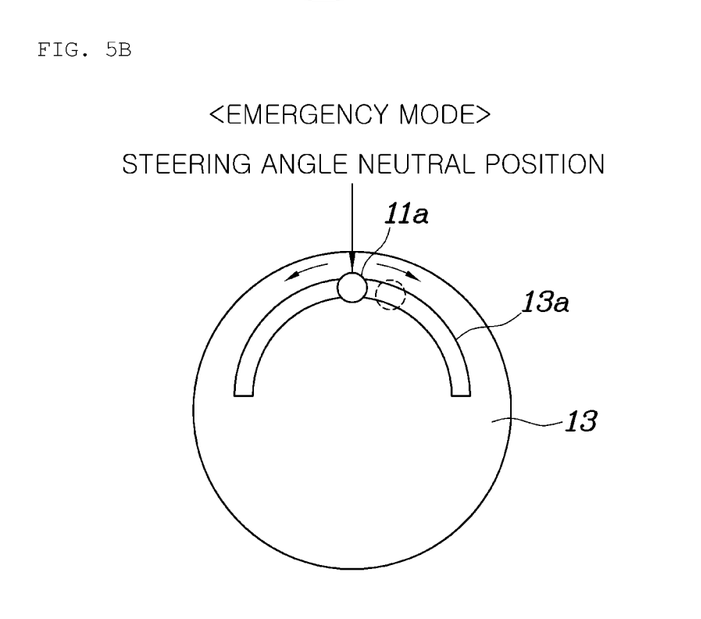

In addition, describing the abnormal situation in which the rotation of the tire is hindered by external factors and thus the tire is not steered with reference to FIG. 5B, when the difference between the steering angle and the pinion rotation angle exceeds the set value, the locking action of the second ring gear R2 by the solenoid valve 9 is released and the second ring gear R2 is more quickly rotated by the operation of the second motor 7 to more increase the gear ratio of the second planetary gear set PG2.

Therefore, even when the steering wheel 3 is rotated a little, the protrusion 11a is quickly rotated to be locked to an end part of the slot 13a, such that the driver may quickly recognize that the tire may not be rotated.

As described above, according to the exemplary embodiment of the present invention, by implementing a function of limiting the maximum steering angle of the steering wheel 3 while generating the steering wheel reaction torque and the recovering wheel reaction torque to the steering wheel 3 by using the planetary gear decelerator and implementing an active front steering system (AFS) function of actively controlling a steering gear ration depending on a vehicle driving situation, unique space efficiency of the steer by wire system is secured, thereby improving marketability of a vehicle.

As described above, according to the exemplary embodiments of the present invention, it is possible to implement the more compact power steering system structure by implementing the additional function of the AFS system in the MDPS system, reduce the product costs by controlling the power steering system with the integrated ECU, and improve the steering feel and the driving stability of the vehicle by implementing the unique functions of the AFS system and the MDPS system as they are.

Meanwhile, although specific examples of the present invention have been described above in detail, it is obvious to those skilled in the art that various modifications and alterations may be made without departing from the spirit and scope of the present invention. In addition, it is obvious that these modifications and alterations are within the following claims.

What is claimed is:

1. A steering apparatus for a steer by wire system, the steering apparatus comprising:
   a first motor and a second motor configured to provide a torque;
   a first planetary gear set configured to receive the torque from the first motor and reduce the torque and output the reduced torque to a steering wheel to generate a reaction torque for steering;
   a second planetary gear set configured to receive the torque from the steering wheel and the second motor, to reduce and output the torque, and to variably output a gear ratio for an input by the steering wheel depending on a rotation of the second motor; and
   a stopping mechanism configured to be locked to a second stopper portion on a rotation path of a first stopper portion rotated on the basis of the torque output from the second planetary gear set to serve to limit a maximum rotation angle of the steering wheel;
   wherein the first planetary gear set is provided with at least three rotation elements, a first of the at least three rotation elements configured to receive the torque from the first motor, a second of the at least three rotation elements configured to reduce the torque and output the reduced torque to the steering wheel, and remaining rotation elements being fixed.

2. The steering apparatus of claim 1, wherein the first motor, the first planetary gear set, the second planetary gear set, and the stopping mechanism are sequentially disposed on a steering shaft connected to the steering wheel.

3. The steering apparatus of claim 1, wherein the at least three rotation elements of the first planetary gear set include first, second, and third rotation elements;
   wherein the first rotation element is a first sun gear directly connected to the first motor,
   wherein the second rotation element is a first planetary gear that is connected to the steering wheel to reduce and output a torque transferred from the first sun gear; and wherein the third rotation element is a first ring gear operated as a regular fixed element.

4. The steering apparatus of claim 1, wherein the second planetary gear set is provided with at least three rotation elements, a first one of the at least three rotation elements configured to receive the torque from the steering wheel, a second of the at least three rotation elements configured to reduce the torque and output the reduced torque to the stopping mechanism, and remaining rotation elements being connected to the second motor to receive the torque or selectively fixed.

5. The steering apparatus of claim 1, wherein the second planetary gear set is configured to include first, second, and third rotation elements;
   wherein the first rotation element is a second sun gear connected to the steering wheel;
   wherein the second rotation element is a second planetary gear that is connected to the first stopper portion to reduce and output a torque transferred from the second sun gear; and
   wherein the third rotation element is a second ring gear receiving the torque from the second motor or operated as a selective fixed element.

6. The steering apparatus of claim 5, wherein the stopping mechanism comprises:
   the first stopper portion configured to be directly connected to the second planetary gear and having a protrusion formed at a predetermined radius position thereof; and
   the second stopper portion configured to be provided with a slot having the protrusion inserted thereinto and having a predetermined rotation angle range along a rotation path of the protrusion.

7. The steering apparatus of claim 6, wherein the rotation angle range of the slot is determined by a maximum steering angle required in the steering wheel with respect to a steering angle neutral and a relationship between gear ratios of the first planetary gear set and the second planetary gear set.

8. A vehicle comprising:
   a steering wheel;
   a driving wheel;
   steering motor connected to the driving wheel;
   an electronic control unit configured to provide a rotation signal of the steering wheel to cause the steering motor to effect the driving wheel based on the rotation signal;
   a first motor and a second motor configured to provide a torque;
   a first planetary gear set configured to receive the torque from the first motor and reduce the torque and output the reduced torque to the steering wheel to generate a reaction torque for steering;
   a second planetary gear set configured to receive the torque from the steering wheel and the second motor, to reduce and output the torque, and to variably output a gear ratio for an input by the steering wheel depending on a rotation of the second motor; and
   a stopping mechanism configured to be locked to a second stopper portion on a rotation path of a first stopper portion rotated on the basis of the torque output from the second planetary gear set to serve to limit a maximum rotation angle of the steering wheel;
   wherein the first planetary gear set is provided with at least three rotation elements, a first of the at least three rotation elements configured to receive the torque from the first motor, a second of the at least three rotation elements configured to reduce the torque and output the reduced torque to the steering wheel, and remaining rotation elements being fixed.

9. The vehicle of claim 8, wherein the first motor, the first planetary gear set, the second planetary gear set, and the stopping mechanism are sequentially disposed on a steering shaft connected to the steering wheel.

10. The vehicle of claim 8, wherein the first planetary gear set is configured to include the first, the second, and a third rotation element;
    wherein the first rotation element is a first sun gear directly connected to the first motor,
    wherein the second rotation element is a first planetary gear that is connected to the steering wheel to reduce and output a torque transferred from the first sun gear; and
    wherein the third rotation element is a first ring gear operated as a regular fixed element.

11. The vehicle of claim 8, wherein the second planetary gear set is provided with at least three rotation elements, a first one of the at least three rotation elements configured to receive the torque from the steering wheel, a second of the at least three rotation elements configured to reduce the torque and output the reduced torque to the stopping mechanism, and remaining rotation elements being connected to the second motor to receive the torque or selectively fixed.

12. The vehicle of claim 8, wherein the second planetary gear set is configured to include first, second, and third rotation elements;
    wherein the first rotation element is a second sun gear connected to the steering wheel;
    wherein the second rotation element is a second planetary gear that is connected to the first stopper portion to reduce and output a torque transferred from the second sun gear; and
    wherein the third rotation element is a second ring gear receiving the torque from the second motor or operated as a selective fixed element.

13. The vehicle of claim 12, wherein the stopping mechanism comprises:
    the first stopper portion configured to be directly connected to the second planetary gear and having a protrusion formed at a predetermined radius position thereof; and
    the second stopper portion configured to be provided with a slot having the protrusion inserted thereinto and having a predetermined rotation angle range along a rotation path of the protrusion.

14. The vehicle of claim 13, wherein the rotation angle range of the slot is determined by a maximum steering angle required in the steering wheel with respect to a steering angle neutral and a relationship between gear ratios of the first planetary gear set and the second planetary gear set.

15. A steering apparatus for a steer by wire system, the steering apparatus comprising:
    a first motor and a second motor configured to provide a torque;
    a first planetary gear set configured to receive the torque from the first motor and reduce the torque and output the reduced torque to a steering wheel to generate a reaction torque for steering;
    a second planetary gear set configured to receive the torque from the steering wheel and the second motor, to reduce and output the torque, and to variably output a gear ratio for an input by the steering wheel depending on a rotation of the second motor; and
    a stopping mechanism configured to be locked to a second stopper portion on a rotation path of a first stopper portion rotated on the basis of the torque output from the second planetary gear set to serve to limit a maximum rotation angle of the steering wheel;

wherein the second planetary gear set includes first, second, and third rotation elements;

wherein the first rotation element is a second sun gear connected to the steering wheel;

wherein the second rotation element is a second planetary gear that is connected to the first stopper portion to reduce and output a torque transferred from the second sun gear; and wherein the third rotation element is a second ring gear receiving the torque from the second motor or operated as a selective fixed element.

16. The steering apparatus of claim 15, wherein the first motor, the first planetary gear set, the second planetary gear set, and the stopping mechanism are sequentially disposed on a steering shaft connected to the steering wheel.

17. The steering apparatus of claim 15, wherein the first planetary gear set includes first, second, and third rotation elements;

wherein the first rotation element is a first sun gear directly connected to the first motor, wherein the second rotation element is a first planetary gear that is connected to the steering wheel to reduce and output a torque transferred from the first sun gear; and wherein the third rotation element is a first ring gear operated as a regular fixed element.

18. The steering apparatus of claim 15, wherein the stopping mechanism comprises:

the first stopper portion configured to be directly connected to the second planetary gear and having a protrusion formed at a predetermined radius position thereof; and the second stopper portion configured to be provided with a slot having the protrusion inserted thereinto and having a predetermined rotation angle range along a rotation path of the protrusion.

19. The steering apparatus of claim 18, wherein the rotation angle range of the slot is determined by a maximum steering angle required in the steering wheel with respect to a steering angle neutral and a relationship between gear ratios of the first planetary gear set and the second planetary gear set.

20. A vehicle comprising:

a steering wheel;

the steering apparatus of claim 18, wherein the steering apparatus is functionally coupled to the steering wheel;

a driving wheel;

steering motor connected to the driving wheel; and an electronic control unit configured to provide a rotation signal of the steering wheel to cause the steering motor to effect the driving wheel based on the rotation signal.

* * * * *